United States Patent
Atzler et al.

(10) Patent No.: US 11,441,542 B2
(45) Date of Patent: Sep. 13, 2022

(54) OPERATING A WIND TURBINE USING ESTIMATED WIND SPEED WHILE ACCOUNTING FOR BLADE TORSION

(71) Applicant: VESTAS WIND SYSTEMS A/S, Aarhus N (DK)

(72) Inventors: Martin Atzler, Randers (DK); Thomas Scheel, Stolberg (DE); Lars Finn Sloth Larsen, Sydals (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 310 days.

(21) Appl. No.: 15/528,450

(22) PCT Filed: Nov. 20, 2015

(86) PCT No.: PCT/DK2015/050354
§ 371 (c)(1),
(2) Date: May 19, 2017

(87) PCT Pub. No.: WO2016/078669
PCT Pub. Date: May 26, 2016

(65) Prior Publication Data
US 2017/0321660 A1   Nov. 9, 2017

(30) Foreign Application Priority Data
Nov. 21, 2014 (DK) .......................... PA 2014 70725

(51) Int. Cl.
*F03D 17/00* (2016.01)
*F03D 7/02* (2006.01)
(Continued)

(52) U.S. Cl.
CPC ........... *F03D 17/00* (2016.05); *F03D 7/0224* (2013.01); *F03D 7/0276* (2013.01); *G01P 5/00* (2013.01);
(Continued)

(58) Field of Classification Search
CPC ...... F03D 7/0224; F03D 17/00; F03D 7/0276; G01P 5/00; G05B 17/02; F05B 2240/221;
(Continued)

(56) References Cited

U.S. PATENT DOCUMENTS 4,160,170 A   7/1979   Harner et al.
8,803,352 B1  8/2014   Koerber et al.
(Continued)

FOREIGN PATENT DOCUMENTS

CN   102460489 A   5/2012
CN   102767475 A   11/2012
(Continued)

OTHER PUBLICATIONS

International Search Report for PCT/DK2015/050354, dated Feb. 18, 2016.
(Continued)

*Primary Examiner* — Tejal Gami
(74) *Attorney, Agent, or Firm* — Patterson + Sheridan, LLP

(57) ABSTRACT

A method for estimating a wind speed at a wind turbine is disclosed, said wind turbine comprising a rotor carrying a set of wind turbine blades, each wind turbine blade having a variable pitch angle. A blade torsion contribution, representing torsion introduced in the wind turbine blades, is derived, based on an obtained rotational speed, $\omega$, of the rotor, and an obtaining a pitch angle, $\theta$, of the wind turbine blades. An adjusted pitch angle, $\theta'$, is calculated as a sum of the obtained pitch angle, $\theta$, and the derived blade torsion contribution, and a wind speed, $v_{est}$, is estimated, based on the obtained rotational speed, $\omega$, and the calculated adjusted pitch angle, $\theta'$. An accurate and reliable estimate for the wind speed is thereby obtained. The wind turbine may be controlled in accordance with the estimated wind speed, $v_{est}$.

19 Claims, 3 Drawing Sheets

(51) Int. Cl.
*G01P 5/00* (2006.01)
*G05B 17/02* (2006.01)

(52) U.S. Cl.
CPC ........ *G05B 17/02* (2013.01); *F05B 2240/221* (2013.01); *F05B 2270/327* (2013.01); *F05B 2270/328* (2013.01); *Y02E 10/72* (2013.01)

(58) Field of Classification Search
CPC ......... F05B 2270/327; F05B 2270/328; Y02E 10/72
See application file for complete search history.

(56) References Cited

U.S. PATENT DOCUMENTS

| | | |
|---|---|---|
| 2009/0220340 A1 | 9/2009 | Pierce et al. |
| 2010/0014969 A1 | 1/2010 | Wilson et al. |
| 2011/0084485 A1 | 4/2011 | Miranda et al. |
| 2013/0161952 A1 | 6/2013 | Bjerge et al. |
| 2013/0181450 A1* | 7/2013 | Narayana ................. F03D 7/02 290/44 |
| 2013/0261819 A1 | 10/2013 | Chauvin |
| 2013/0280067 A1 | 10/2013 | Goodman et al. |
| 2013/0302161 A1 | 11/2013 | Koerber et al. |

FOREIGN PATENT DOCUMENTS

| | | |
|---|---|---|
| CN | 103244350 A | 8/2013 |
| EP | 2175281 A1 | 4/2010 |
| EP | 2520800 A1 | 11/2012 |
| GB | 2479923 A | 11/2011 |
| WO | 2007/010322 A1 | 1/2007 |
| WO | 2009047061 A1 | 4/2009 |
| WO | 2009153614 A2 | 12/2009 |
| WO | 2014026688 A1 | 2/2014 |

OTHER PUBLICATIONS

Danish Search Report for PA 2014 70725, dated Jun. 19, 2015.
Chinese Office Action dated Jul. 9, 2018 for Application No. 201580063151.4.
European Examination for Application No. 15 801 316.9-1007 dated Aug. 10, 2019.

* cited by examiner

OPERATING A WIND TURBINE USING ESTIMATED WIND SPEED WHILE ACCOUNTING FOR BLADE TORSION

FIELD OF THE INVENTION

The present invention relates to a method for estimating a wind speed at a position of a wind turbine. According to the method of the invention, the wind speed can be estimated in an accurate and reliable manner, even at high wind speeds and/or for wind turbines with flexible wind turbine blades.

BACKGROUND OF THE INVENTION

When operating a wind turbine it is sometimes desirable to be able to estimate the wind speed prevailing at the wind turbine, more particularly the wind speed experienced by the wind turbine blades of the wind turbine. When the wind speed is measured, this is often done at a point behind the rotor of the wind turbine. Thereby the measured wind speed is affected by the impact on the wind by the rotor, and therefore it does not reflect the wind speed at a position in front of the rotor. Furthermore, since the wind speed is typically measured in a single point, it will not reflect variations in the wind speed across an area defined by the rotor. Accordingly, controlling the wind turbine on the basis of such a measured wind speed may lead to inaccurate control of the wind turbine.

Therefore, various attempts have previously been made in order to provide an estimate for the wind speed at a wind turbine.

U.S. Pat. No. 5,155,375 discloses a controller and a method for operating a variable speed wind turbine to better track wind speed fluctuations for greater efficiency in conversion of wind energy to electrical energy. The rotor speed is controlled with a wind speed supplied by a wind observer which predicts the average wind speed at a subsequent point in time over the cross section presented to the wind by the wind turbine. The wind speed is predicted as a function of the present (previously predicted) wind speed and correction terms including net torque and the difference between the predicted and actual rotor speed.

DESCRIPTION OF THE INVENTION

It is an object of embodiments of the invention to provide a method for estimating a wind speed at a wind turbine, which allows the wind speed to be estimated in an accurate and reliable manner.

It is a further object of embodiments of the invention to provide a method for estimating a wind speed at a wind turbine, which provides a reliable estimate for the wind speed at high wind speeds.

It is an even further object of embodiments of the invention to provide a method for estimating a wind speed at a wind turbine, which provides a reliable estimate for the wind speed at wind turbines with flexible wind turbine blades.

The invention provides a method for estimating a wind speed at a wind turbine, said wind turbine comprising a rotor carrying a set of wind turbine blades, each wind turbine blade having a variable pitch angle, the method comprising the steps of:
  obtaining a rotational speed, $\omega$, of the rotor,
  obtaining a pitch angle, $\theta$, of the wind turbine blades,
  deriving a blade torsion contribution, based on the obtained rotational speed, $\omega$, and the obtained pitch angle, $\theta$,
  calculating an adjusted pitch angle, $\theta'$, as a sum of the obtained pitch angle, $\theta$, and the derived blade torsion contribution, and
  estimating a wind speed, $v_{est}$, based on the obtained rotational speed, $\omega$, and the calculated adjusted pitch angle, $\theta'$.

The invention provides a method for estimating a wind speed at a wind turbine, the wind turbine comprising a rotor carrying a set of wind turbine blades. The wind turbine blades catch the wind, thereby causing the rotor to rotate, i.e. the energy of the wind is transformed into mechanical energy. The rotor is connected to a generator, e.g. via a drive train. Thereby the mechanical energy, in the form of rotational movements of the rotor, is transformed into electrical energy, which may be supplied to a power grid.

The estimated wind speed may advantageously be a wind speed prevailing in front of the rotor of the wind turbine, i.e. the wind speed which is experienced by the wind turbine blades carried by the rotor.

Each of the wind turbine blades has a variable pitch angle. Thus, each of the wind turbine blades can be rotated about a longitudinal axis, in order to adjust an angle of attack between the wind and the wind turbine blade. Accordingly, the wind turbine is of a pitch controlled type.

According to the method of the invention, a rotational speed, $\omega$, of the rotor and a pitch angle, $\theta$, of the wind turbine blades are obtained. This may include measuring the rotational speed and/or the pitch angle. As an alternative, the rotational speed and/or the pitch angle may be obtained from a control unit controlling the wind turbine, the rotor and/or a pitch system of the wind turbine.

The obtained pitch angle, $\theta$, is a set pitch angle, in the sense that it is the angular setting at the pitch mechanism of the wind turbine blade, i.e. in a region near the root of the wind turbine blade.

Next, a blade torsion contribution is derived, based on the obtained rotational speed, $\omega$, and the obtained pitch angle, $\theta$.

When a wind turbine blade is subjected to the wind, a torsion is introduced in the wind turbine blade, which tends to twist the blade substantially about its longitudinal axis, and along the length of the blade. The torsion introduced in the wind turbine blade increases as the wind speed increases, assuming that the wind turbine is not derated. Furthermore, the torsion depends on the rotational speed of the rotor and the pitch angle of the wind turbine blade. Blade torsion depends substantially linearly on rotational speed of the rotor. Finally, the torsion introduced in the wind turbine blade depends on various design parameters of the wind turbine blade, such as the flexibility of the wind turbine blade and the length of the wind turbine blade. In general, the torsion introduced in the wind turbine blade tends to increase as the length of the wind turbine blade increases, due to an increase in 'relative' flexibility of the wind turbine blades. Accordingly, a torsion effect will generally be more pronounced in wind turbines with a large rotor diameter than in wind turbines with a smaller rotor diameter.

When a torsion is introduced in the wind turbine blade, as described above, the angle of attack between the wind turbine blade and the wind changes. Accordingly, an effective pitch angle of the wind turbine blade will, in this case, differ from the set pitch angle, $\theta$, measured at or near the root of the wind turbine blade. The difference between the set pitch angle, $\theta$, and the effective pitch angle, i.e. the pitch angle which is actually experienced by the wind meeting the wind turbine blade, is in the present context referred to as a blade torsion contribution.

Next, an adjusted pitch angle, θ', is calculated as a sum of the obtained pitch angle, θ, and the derived blade torsion contribution. Thus, the adjusted pitch angle, θ', corresponds to the effective pitch angle, i.e. to the pitch angle actually experienced by the wind meeting the wind turbine blade.

Finally, a wind speed, $v_{est}$, is estimated, based on the obtained rotational speed, ω, and the calculated adjusted pitch angle, θ'. Thus, the estimated wind speed, $v_{est}$, is obtained on the basis of the pitch angle which is actually experienced by the wind meeting the wind turbine blade, rather than on the basis of the set pitch angle, θ. Thereby the wind speed can be estimated in a more accurate and reliable manner. This is particularly the case for wind turbines having a large rotor diameter, and/or for wind turbines having wind turbine blades with high flexibility, where the torsion effect is more pronounced, and the error introduced when estimating the wind speed on the basis of the set pitch angle, θ, is therefore expected to be large.

Furthermore, the blade torsion contribution can be derived in a manner which reflects various design parameters of the actual wind turbine, including design parameters of the wind turbine blades, and thereby the wind speed can be estimated in an accurate and reliable manner, regardless of the design parameters of the wind turbine.

The method may further comprise the step of controlling the wind turbine in accordance with the estimated wind speed, $v_{est}$. According to this embodiment, the invention further provides a method for controlling a wind turbine.

The step of controlling the wind turbine may, e.g., include controlling the pitch angle of the wind turbine blades, the rotational speed of the rotor, a power output of the wind turbine, etc.

Alternatively or additionally, the estimated wind speed, $v_{est}$, may be used for other purposes, such as fault detection in the wind turbine.

The step of deriving a blade torsion contribution may comprise using a blade torsion look-up table comprising interrelated values of rotational speed, ω, pitch angle, θ, and blade torsion contribution. According to this embodiment, the blade torsion look-up table is provided before operation of the wind turbine is initiated, and during operation the previously provided blade torsion look-up table is consulted whenever this is required in order to derive a blade torsion contribution. Using a look-up table is a simple approach, which limits the required processing power for performing the method.

When the rotational speed, ω, and the pitch angle, θ, are known, the blade torsion look-up table provides a corresponding blade torsion contribution by a simple look-up in the blade torsion look-up table. The blade torsion look-up table may, e.g., be organised as a number of look-up tables, each look-up table providing blade torsion contributions corresponding to one pitch angle and a plurality of rotational speeds.

The blade torsion look-up table may provide discrete interrelated values of rotational speed, ω, pitch angle, θ, and blade torsion contribution. In this case an interpolation between two discrete values may be performed when the blade torsion contribution is derived, based on the rotational speed and the pitch angle.

The method may further comprise the step of generating the blade torsion look-up table by means of a model based simulation. The model based simulation may advantageously take design features of the wind turbine, in particular design features of the wind turbine blades, into account. Such design features could, e.g., include length of the wind turbine blades and/or torsional stiffness of the wind turbine blades. Furthermore, the model based simulation may take specific conditions at the site of wind turbine into account, e.g. prevailing weather conditions, prevailing wind speeds, prevailing wind directions, wake conditions, etc. Accordingly, the blade torsion look-up table generated in this manner provides an output in the form of a blade torsion contribution, which is expected to closely reflect the actual blade torsion occurring on the wind turbine blade. Thereby the calculated adjusted pitch angle, θ', is very close to the actual pitch angle experienced by the wind meeting the wind turbine blade, and a very accurate wind estimation is therefore obtained.

The model based simulation may, e.g., include performing two sets of simulations. In the first set of simulations, the wind turbine blades are simulated as being completely stiff in the torsion direction. In the second set of simulations, the wind turbine blades are simulated with the actual torsional stiffness of the wind turbine blades. The difference in pitch angle between the two sets of simulations, as a function of pitch angle, θ, and rotational speed, ω, is used as the blade torsion contribution.

As an alternative to providing a blade torsion look-up table, the blade torsion contribution may be derived by performing online calculations.

The step of estimating a wind speed, $v_{est}$, may comprise using a $c_P$ look-up table comprising interrelated values of rotational speed, ω, wind speed, v, adjusted pitch angle, θ', and power coefficient, $c_P$.

According to this embodiment, a power coefficient, $c_P$, is obtained as an intermediate step when estimating the wind speed, $v_{est}$. This is often done by means of a $c_P$ look-up table. Normally, a $c_P$ look-up table provides interrelated values of tip speed ratio, λ, pitch angle, θ, and power coefficient, $c_P$. The tip speed ratio, λ, is defined as:

$$\lambda = \frac{\omega R}{v},$$

where ω is the rotational speed of the rotor, R is the radius of the rotor, and v is the wind speed. Thus, the power coefficient, $c_P$, is in fact derivable from the rotational speed, ω, the pitch angle, θ, and the wind speed, v, for a given wind turbine with a given rotor radius, R. Therefore, if the power coefficient, $c_P$, the rotational speed, ω, and the pitch angle, θ, are known or estimated, the wind speed, v, can be derived. As an alternative, an estimated power coefficient, $c_P$, can be derived on the basis of an estimated wind speed, $v_{est}$, e.g. from a previous iteration, or from a wind speed measurement performed by means of a met mast.

When the set pitch angle, θ, is used as an input when the power coefficient, $c_P$, is derived using a $c_P$ look-up table, as it is the case in prior art methods, an inaccurate $c_P$ value is obtained. However, according to the present invention, the adjusted pitch angle, θ', is used as an input. Thereby the pitch angle which the wind is actually experiencing is used as an input, and a much more accurate and reliable power coefficient, $c_P$, is therefore obtained.

The power coefficient, $c_P$, derived as an intermediate step as described above, may be used for other purposes than estimating the wind speed and/or controlling the wind turbine. For instance, the power coefficient, $c_P$, may be used for monitoring purposes.

The step of estimating a wind speed, $v_{est}$, may be performed as an iterative process. For instance, this may include deriving an estimated power coefficient, $c_P$, based on the measured rotational speed, ω, the adjusted pitch angle, θ', and the wind speed, $v_{est}$, which was estimated during the previous iteration. The power coefficient, $c_P$, estimated in this manner may then be used for estimating a new wind speed, $v_{est}$, which can be used as an input for the next iteration, etc. The iterative process should converge towards a value which is close or equal to the actual wind speed at the wind turbine, preferably within a limited number of iterations.

The step of estimating a wind speed, $v_{est}$, may comprise estimating a power output, $P_{est}$, of the wind turbine, and comparing the estimated power output, $P_{est}$, to a measured power output, $P_{meas}$, of the wind turbine. If the estimated power output, $P_{est}$, differs from the measured power output, $P_{meas}$, then the estimated wind speed, $v_{est}$, probably also differs from the actual wind speed. Therefore, the estimated wind speed, $v_{est}$, is adjusted if it is determined that the estimated power output, $P_{est}$, differs from the measured power output, $P_{meas}$. This may advantageously be part of an iterative process.

The estimated power output, $P_{est}$, may, e.g., take estimated power losses introduced in the wind turbine, such as power losses introduced in the drive train, into account.

There is provided a wind turbine and a computer program product for implementing one or more of the features of the method.

Embodiments and features described herein may be combined in any combination.

BRIEF DESCRIPTION OF THE DRAWINGS

The invention will now be described in further detail with reference to the accompanying drawings in which.

DETAILED DESCRIPTION OF THE DRAWINGS

Figure 1:
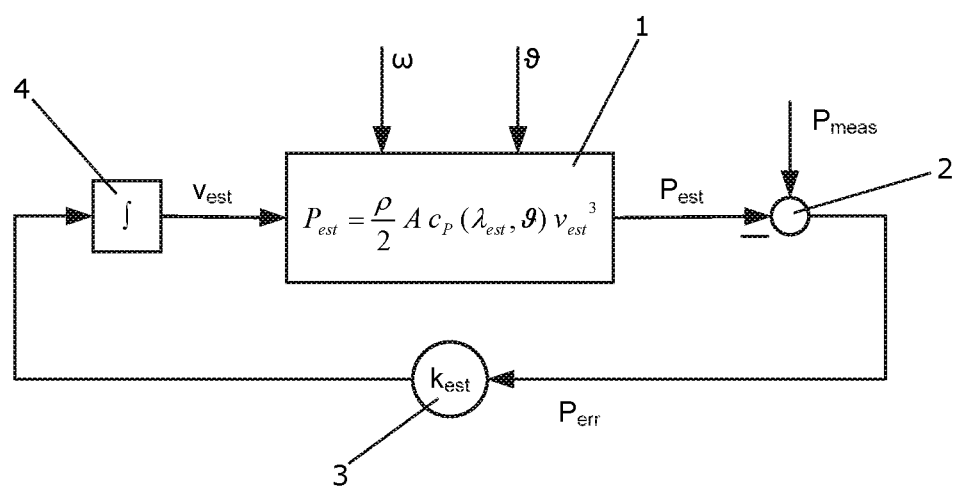
FIG. 1 is a block diagram illustrating a method according to an embodiment of the invention.

FIG. 1 is a block diagram illustrating a method according to an embodiment of the invention, in the form of a closed loop approximation process. A rotational speed, ω, of the rotor of a wind turbine, and a pitch angle, θ, of the wind turbine blades of the wind turbine are measured and supplied to an estimating block 1. Furthermore, a previously estimated wind speed, $v_{est}$, is also supplied to the estimating block 1.

In the estimating block 1, an estimated power output, $P_{est}$, is calculated, based on the supplied parameters, ω, θ and $v_{est}$. This includes deriving a power coefficient, $c_P$, e.g. by means of a $c_P$ look-up table, based on an estimated tip speed ratio, $\lambda_{est}$, and the pitch angle, θ.

However, before deriving the power coefficient, $c_P$, an adjusted pitch angle, θ', is calculated as the sum of the measured pitch angle, θ, and a blade torsion contribution representing torsion introduced in the wind turbine blade, resulting in the wind turbine blade being twisted about a longitudinal axis of the wind turbine blade. The blade torsion contribution is derived on the basis of the measured rotational speed, ω, and the measured pitch angle, θ, e.g. using a blade torsion look-up table. This may, e.g., be performed in the manner described above. The adjusted pitch angle, θ', is used as an input for deriving the power coefficient, $c_P$. Thereby the power coefficient, $c_P$, is derived on the basis of the actual pitch angle, θ', which the wind experiences when meeting the wind turbine blade, instead of on the basis of the set pitch angle, θ, which is not representative for the angular position of the wind turbine blade, due to the torsion introduced in the wind turbine blade. Accordingly, the derived power coefficient, $c_P$, is accurate and reliable, and thereby the estimated power output, $P_{est}$, is also accurate and reliable.

The estimated power output, $P_{est}$, is compared to a measured power output, $P_{meas}$, at a comparator 2. This results in an error signal, $P_{err}$. If the error signal, $P_{err}$, is zero, then $P_{est}=P_{meas}$, indicating that the estimated wind speed, $v_{est}$, supplied to the estimator block 1 is equal to or close to the actual wind speed prevailing at the wind turbine.

If the error signal, $P_{err}$, is positive, then the measured power output, $P_{meas}$, is larger than the estimated power output, $P_{est}$, indicating that the expected power output at the estimated wind speed, $v_{est}$, is lower than the actual power output. This indicates that the estimated wind speed, $v_{est}$, is lower than the actual wind speed prevailing at the wind turbine, and the estimated wind speed, $v_{est}$, should therefore be increased.

Similarly, if the error signal, $P_{err}$, is negative, then the measured power output, $P_{meas}$, is smaller than the estimated power output, $P_{est}$, indicating that the expected power output at the estimated wind speed, $v_{est}$, is higher than the actual power output. This indicates that the estimated wind speed, $v_{est}$, is higher than the actual wind speed prevailing at the wind turbine, and the estimated wind speed, $v_{est}$, should therefore be decreased.

The adjustments to the estimated wind speed, $v_{est}$, described above, are performed in the following manner. The error signal, $P_{err}$, is multiplied by a gain factor, $k_{est}$, at multiplier 3, and the resulting signal is supplied to an integrator 4. At the integrator 4 the signal received from the multiplier 3 is integrated, resulting in a new estimated wind speed, $v_{est}$, which is supplied to the estimating block 1 for the next iteration.

Figure 2:
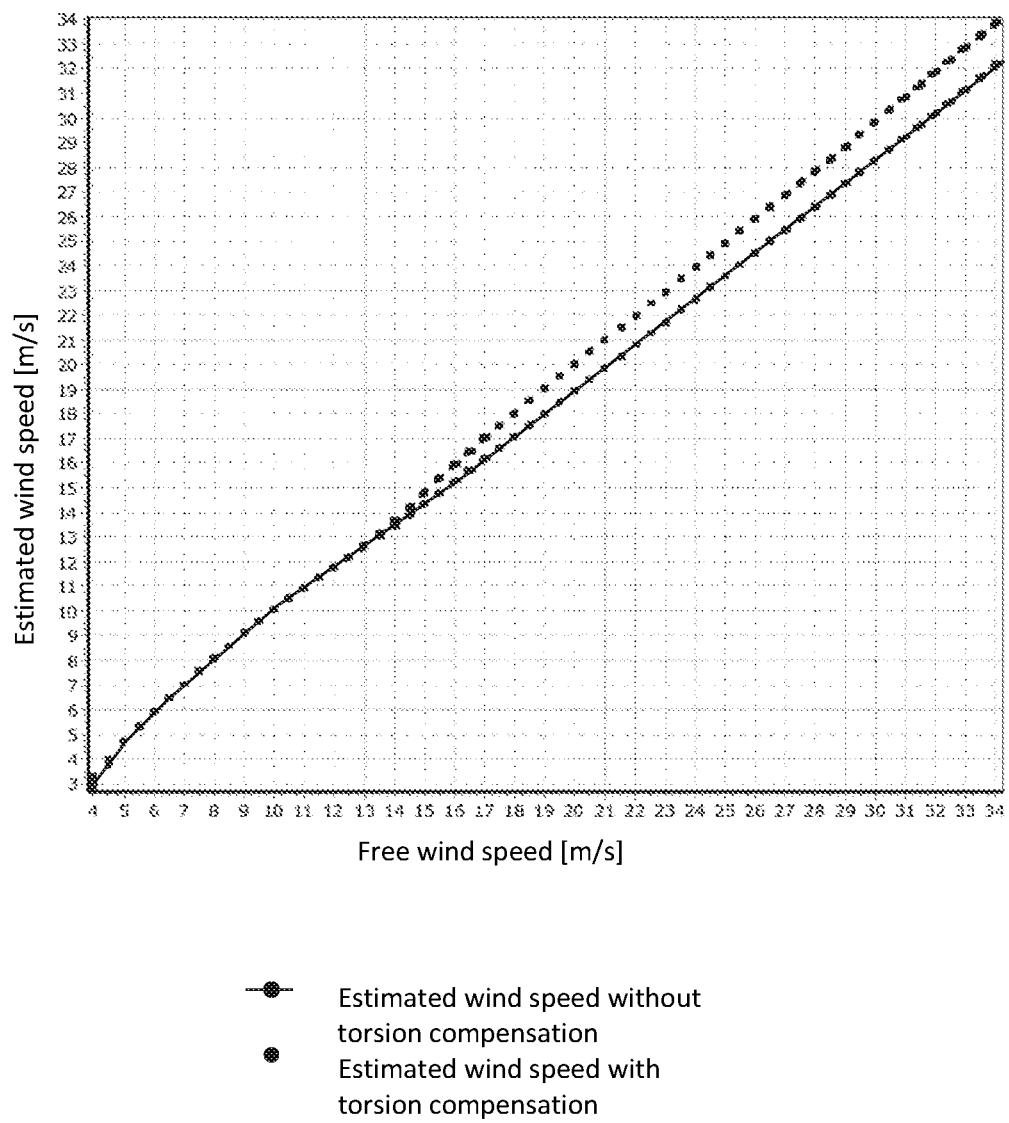
FIG. 2 is a graph illustrating estimated wind speed as a function of free wind speed for a prior art method and a method according to an embodiment the invention.

FIG. 2 is a graph illustrating estimated wind speed as a function of free wind speed for a prior art method and a method according to an embodiment the invention. The free wind speed is the wind speed prevailing immediately in front of the rotor of the wind turbine. It is attempted to estimate this wind speed, e.g. in the manner described above with reference to FIG. 1. If the wind speed is estimated accurately, a diagonal graph will result, i.e. the estimated wind speed is equal to the free wind speed at all wind speeds.

In the graph of FIG. 2 the solid line represents a wind speed estimated using a prior art method, and the dotted line represents a wind speed estimated using a method according to an embodiment of the invention.

In the solid graph, representing the prior art method, the measured pitch angle, θ, is used as an input for deriving the power coefficient, $c_P$. It can be seen that this results in a graph which deviates from the diagonal. In particular, for high wind speeds the estimated wind speed is significantly lower than the free wind speed. Accordingly, an inaccurate estimated wind speed is obtained in this case, in particular at high wind speeds.

On the other hand, in the dotted graph, representing the method according to an embodiment of the invention, an adjusted pitch angle, θ', is used as an input for deriving the power coefficient, $c_P$. The pitch angle is adjusted by adding a blade torsion contribution to the measured pitch angle, θ. Thereby the input used for deriving the power coefficient, $c_P$, reflects the actual conditions prevailing at the wind turbine blades, notably the effective pitch angle of the blade.

It can be seen that using the adjusted pitch angle, θ', as an input for deriving the power coefficient, $c_P$, results in a graph which substantially follows the diagonal. Thus, the estimated wind speed is equal to or very close to the free wind speed. Accordingly, a very accurate and reliable estimate for the wind speed is thereby obtained, when using a method according to an embodiment of the invention.

Figure 3:
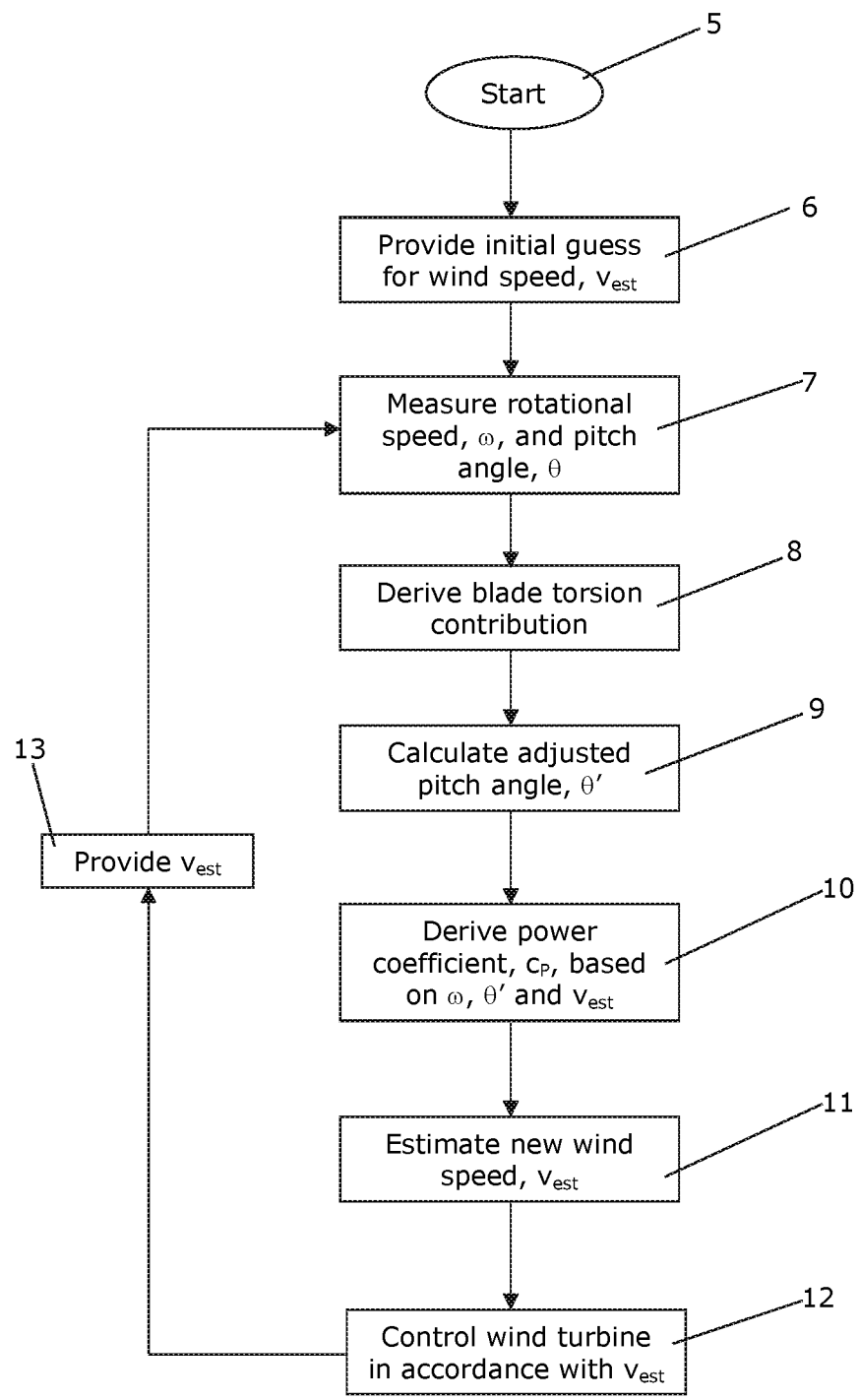
FIG. 3 is a flow chart illustrating a method according to an embodiment of the invention.

FIG. 3 is a flow chart illustrating a method according to an embodiment of the invention. The process is started at step 5. At step 6, an initial guess for an estimated wind speed, $v_{est}$, is provided, in order to initiate an iterative process.

At step 7 a rotational speed, ω, of a rotor of a wind turbine, and a pitch angle, θ, of wind turbine blades of the wind turbine, are measured.

At step 8 a blade torsion contribution is derived, based on the obtained rotational speed, ω, and pitch angle, θ. The blade torsion contribution represents torsion introduced in the wind turbine blades, and resulting in an effective pitch angle of the wind turbine blades, which differs from the measured pitch angle, θ. The blade torsion contribution may, e.g., be derived using a blade torsion look-up table.

At step 9 an adjusted pitch angle, θ', is calculated as the sum of the measured pitch angle, θ, and the derived torsion contribution. Thus, the adjusted pitch angle, θ', represents the effective pitch angle, i.e. the pitch angle which is actually experienced by the wind meeting the wind turbine blade.

At step 10 a power coefficient, $c_P$, is derived, based on the measured rotational speed, ω, the adjusted pitch angle, θ' and the estimated wind speed, $v_{est}$. Since the adjusted pitch angle, θ', and not the measured pitch angle, θ, is used as an input for deriving the power coefficient, $c_P$, it is ensured that the derived power coefficient, $c_P$, is closer to an actual power coefficient of the wind turbine, because it more closely reflects the actually prevailing conditions.

At step 11 a new wind speed, $v_{est}$, is estimated, based on the derived power coefficient, $c_P$. Accordingly, the new estimated wind speed, $v_{est}$, is also very accurate.

At step 12 the wind turbine is operated in accordance with the estimated wind speed, $v_{est}$. Simultaneously, the new estimated wind speed, $v_{est}$, is provided for the next iteration, at step 13. Accordingly, the process is returned to step 7, and the process described above is repeated. However, the new estimated wind speed, $v_{est}$, is applied instead of the initial guess which was provided at step 6. Thus, the method illustrated in FIG. 3 is performed in an iterative manner, in which the estimated wind speed, $v_{est}$, is improved for each iteration.

While embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method of controlling operation of a wind turbine comprising a rotor carrying a set of wind turbine blades, wherein each wind turbine blade of the set has a variable pitch angle, the method comprising:
    obtaining a rotational speed of the rotor;
    obtaining a pitch angle of the wind turbine blades;
    deriving a blade torsion contribution based on the rotational speed and the pitch angle;
    calculating an adjusted pitch angle as a sum of the pitch angle and the blade torsion contribution;
    calculating an estimated wind speed based on the rotational speed and the adjusted pitch angle, wherein calculating the estimated wind speed comprises:
        calculating an estimated power output of the wind turbine for the estimated wind speed;
        comparing the estimated power output to a measured power output of the wind turbine; and
        determining, based on the comparison, whether to update the estimated wind speed; and
    operating the wind turbine based on the estimated wind speed to provide electrical energy to a power grid.

2. The method according to claim 1, wherein deriving the blade torsion contribution comprises:
    using a blade torsion look-up table comprising interrelated values of the rotational speed, the pitch angle, and the blade torsion contribution.

3. The method according to claim 2, further comprising:
    generating the blade torsion look-up table using a model-based simulation.

4. The method according to claim 1, wherein calculating the estimated wind speed comprises:
    using a power coefficient look-up table comprising interrelated values of the rotational speed, a wind speed, the adjusted pitch angle, and a power coefficient.

5. The method according to claim 1, wherein calculating the estimated wind speed is performed as an iterative process.

6. A wind turbine comprising:
    a rotor carrying a set of wind turbine blades, wherein each wind turbine blade of the set has a variable pitch angle; and
    a controller configured to implement an operation, comprising:
        obtaining a rotational speed of the rotor;
        obtaining a pitch angle of the wind turbine blades;
        deriving a blade torsion contribution based on the rotational speed and the pitch angle;
        calculating an adjusted pitch angle as a sum of the pitch angle and the blade torsion contribution;
        calculating an estimated wind speed based on the rotational speed and the adjusted pitch angle, wherein calculating the estimated wind sped comprises:
            calculating an estimated power output of the wind turbine for the estimated wind speed;
            comparing the estimated power output to a measured power output of the wind turbine; and
            determining, based on the comparison, whether to update the estimated wind speed; and
        operating the wind turbine based on the estimated wind speed to provide electrical energy to a power grid.

7. A computer program product comprising computer readable executable code which, when executing on one or more processors, implements an operation, comprising:
    obtaining a rotational speed of a rotor of a wind turbine;
    obtaining a pitch angle of one or more wind turbine blades attached to the rotor;
    deriving a blade torsion contribution based on the rotational speed and the pitch angle;
    calculating an adjusted pitch angle as a sum of the pitch angle and the blade torsion contribution;

calculating an estimated wind speed based on the rotational speed and the adjusted pitch angle, wherein calculating the estimated wind speed comprises:
  calculating an estimated power output of the wind turbine for the estimated wind speed;
  comparing the estimated power output to a measured power output of the wind turbine; and
  determining, based on the comparison, whether to update the estimated wind speed; and
operating the wind turbine based on the estimated wind speed to provide electrical energy to a power grid.

8. The method of claim 1, wherein operating the wind turbine comprises one of:
  controlling the pitch angle of the wind turbine blades;
  controlling the rotational speed of the rotor; and
  controlling a power output of the wind turbine.

9. The method of claim 1, wherein calculating the estimated power output comprises:
  estimating one or more power losses in the wind turbine.

10. The method of claim 1, wherein calculating the estimated wind speed further comprises:
  setting the estimated wind speed responsive to determining that the estimated power output equals the measured power output.

11. The method of claim 3, wherein the model-based simulation comprises:
  obtaining a first pitch angle from a first simulation in which the wind turbine blades are modeled as being completely stiff in a torsion direction; and
  obtaining a second pitch angle from a second simulation in which the wind turbine blades are modeled with actual torsional stiffness values,
  wherein the blade torsion contribution is based on a difference of the first pitch angle and the second pitch angle.

12. The method of claim 5, wherein calculating the estimated power output and comparing the estimated power output to the measured power output occurs in a first iteration, the method further comprising:
  deriving, in the first iteration, a power coefficient of the wind turbine based on the rotational speed, the adjusted pitch angle, and an estimated wind speed from a previous iteration; and
  updating the estimated wind speed responsive to the comparison, wherein the updated estimated wind speed is based on the power coefficient.

13. The method of claim 5, wherein calculating the estimated power output and comparing the estimated power output to the measured power output occurs in a first iteration, the method further comprising:
  updating the estimated wind speed responsive to the comparison; and
  performing, using the updated estimated wind speed, a second iteration of calculating the estimated power output and comparing the estimated power output to the measured power output.

14. The method of claim 13, wherein updating the estimated wind speed comprises:
  determining an error signal representing a difference between the estimated power output and the measured power output;
  multiplying the error signal by a gain factor; and
  integrating the gain factor-multiplied error signal.

15. The wind turbine of claim 6, wherein operating the wind turbine comprises one of:
  controlling the pitch angle of the wind turbine blades;
  controlling the rotational speed of the rotor; and
  controlling a power output of the wind turbine.

16. The wind turbine of claim 6, wherein deriving the blade torsion contribution comprises:
  using a blade torsion look-up table comprising interrelated values of the rotational speed, the pitch angle, and the blade torsion contribution.

17. The wind turbine of claim 16, wherein the operation further comprises:
  generating the blade torsion look-up table using a model-based simulation.

18. The computer program product of claim 7, wherein deriving the blade torsion contribution comprises:
  using a blade torsion look-up table comprising interrelated values of the rotational speed, the pitch angle, and the blade torsion contribution.

19. The computer program product of claim 18, wherein the operation further comprises:
  generating the blade torsion look-up table using a model-based simulation.

* * * * *